C. H. Helms,
Heel Trimming Machine,
No. 1,740, Reissued Aug. 16, 1864.
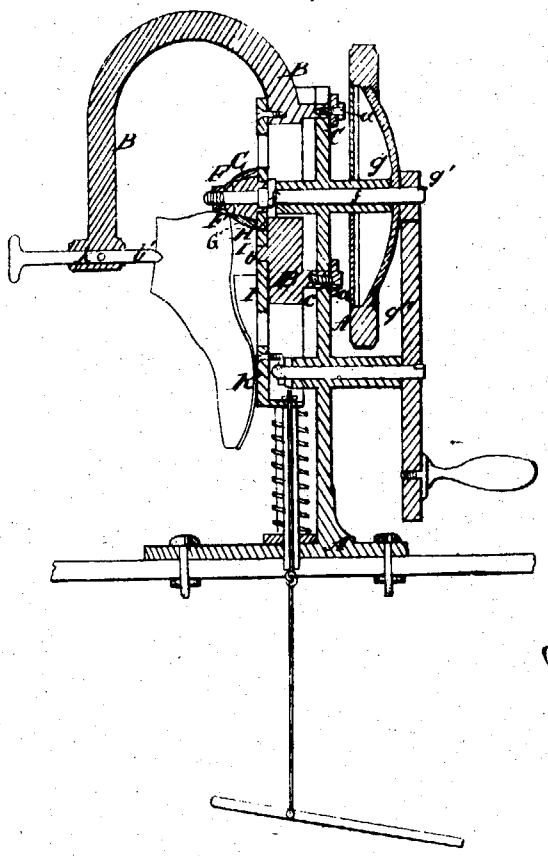
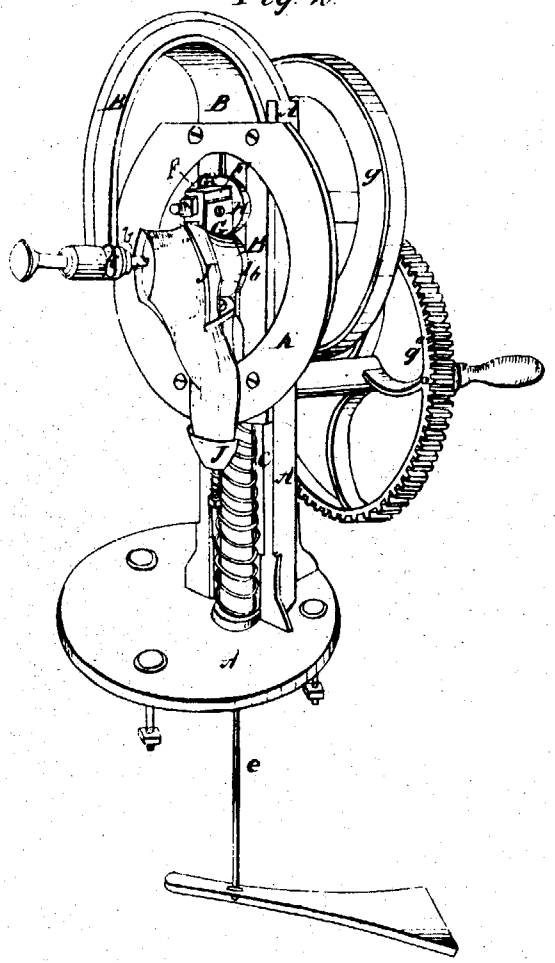
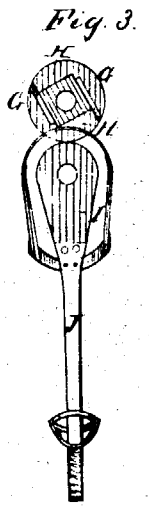
Witnesses.
Hermann J. Dewitt
William D. Jones
Inventor
Chas. H. Helms

UNITED STATES PATENT OFFICE.

CHARLES H. HELMS, OF POUGHKEEPSIE, NEW YORK.

TRIMMING THE HEELS OF BOOTS AND SHOES.

Specification forming part of Letters Patent No. 31,666, dated March 12, 1861; Reissue No. 1,740, dated August 16, 1864.

*To all whom it may concern:*

Be it known that I, CHARLES H. HELMS, of Poughkeepsie, Dutchess county, New York, have invented a new and useful Machine for Trimming and Shaping the Heels of Boots and Shoes, which I denominate a "Heel-Trimmer;" and I do hereby declare the following to be a full description of the same.

The object of my invention is to trim the heels of boots and shoes by a rotatory cutter rotating on an axis parallel with the rotation of the heel of the boot or shoe, so that by the shape of the cutters, guided in their operations by a pattern-plate and a shoulder or loose washer on the outer end of the cutter-stock running in the "rand" or crease of the heel, and resting on the "counter" of the boot or shoe, to protect it from the action of the cutters, the heel can be completely finished by the single operation of a half-rotation of the boot or shoe on its axis.

The nature of my invention consists, first, in the combination of a vertical sliding frame having bearings or centers of action on it, (parallel with the axis of a rotatory cutter,) in which the boot or shoe is centered, with a stationary rotatory cutter adjusted in a suitable standard for supporting the sliding frame, cutter-axis, and propelling-gear, so that the heel of the boot or shoe may be moved to and from the rotatory cutters and pared or trimmed by the single operation of giving a half-rotation to it on its axis; second, in the combination of the pattern-plate attached to the heel of the boot or shoe so as to form one of the centers of the sliding frame on which the boot or shoe rotates, with a stationary rotatory cutter and guide-roller on its axis working or resting on the pattern-plate to guide and limit the action of the cutters in shaping and trimming the heel of the boot or shoe when the said boot or shoe is rotated on an axis parallel with the axis of the rotatory cutters; third, in the combination, with the cutter-stock, of a shoulder or loose roller or washer-plate to the outside of the cutters, so as to run in the rand or crease of the heel and resting upon the counter of the boot or shoe, and thereby limit the action of the cutters to the heel, and thus prevent the counters from getting cut; fourth, in the method of supporting the vertically-acting sliding frame in the guideway of the standard upon a spiral spring, in combination with a foot-lever when the axis of the said sliding frame for holding the boot or shoe is parallel with the axis of the rotatory cutter, so as to enable the operative to move the sliding frame up and down at the same time he rotates the heel of the shoe with his hand under the action of the rotatory cutters.

But to describe my invention more particularly I will refer to the accompanying drawings, forming a part of this specification, the same letters of reference, wherever they occur, referring to like parts.

Figure 1 is a transverse section. Fig. 2 is a perspective view. Fig. 3 is a plan view of the rotatory cutter, showing to the back of them a loose friction-roller working on the edge of the heel-guide or pattern-plate, to which is attached a shoe-holder.

Letter A is the standard, supported upon a suitable table, so as to give firmness and steadiness to the machine when in motion. In the face of this standard is a guideway, *c c c*, in which works a vertical sliding frame, B, made somewhat in the shape of a siphon, the long leg of which works in the guideway, and is held securely in it by means of nuts and washers *a a*, connected with the standard. Under the end of the sliding frame, to prevent it from falling down in the guideway, is adjusted a strong spiral spring, through the center of which passes a rod, *e*, which connects with the end of the sliding frame, and at its lower end with a treadle on the floor.

The object of supporting the sliding frame upon a spring and having a foot-lever to operate it is twofold, first, to obtain an elastic pressure of the heel against the rotatory cutters, and, second, for the purpose of holding the up-and-down motions of the frame under the control of the foot of the operator, so as to allow him the free use of his hands to rotate the shoe on the centers or axis *b* and *b'* of the sliding frame.

Letter F is the rotatory cutter-stock secured on the end of a horizontal axis or journal, *f*, working through a box, *Z*, secured to the standard, and projecting through a vertical slot or opening in the sliding frame, so as to allow it to slide up and down without interference with the axis of the cutter-stock. On the end of the axis or journal is a fly-wheel, and also a pinion wheel, $g$, which gears into a driving gear-wheel, $g''$, or other suitable gear, for rotating the cutter-stock. This cutter-stock is made so as to have two knives on it of any suitable form, and are secured to it by proper set-screws. If deemed necessary, more knives may be used. On the outer end of the cutter-stock is formed a shoulder, $g^3$, the edge of which works in the rand or crease formed between the heel and counter, while the broad part of it rests upon or covers the counter. The object of this device is to limit the action of the cutters to the heel, and at the same time protect the counter from being cut. It will be obvious that a loose roller or washer on the end of the cutter-stock axis may be substituted for the shoulder and answer an equally useful purpose. Letter H is a loose roller running on a shoulder on the back side of the cutter-stock, though this is not material, as it may be placed to run directly on the cutter-stock axis. The object of this roller is to guide or control the action of the rotary cutters in the depth of their cut by resting on a heel or pattern plate, I, secured to the heel of the boot or shoe by small steadying-pins, so as to form one of the bearings or centers of motion for the heel to turn on. Into this bearing in the heel or pattern plate engages a center-pin or axis, $b$, secured to the face of the sliding frame on a line with a corresponding center-pin, $b'$, in the end of the short leg of the sliding frame. The object of this arrangement of these parts is to trim the heel of the boot or shoe from end to end by rotating it on an axis parallel with the axis of the rotary cutters, which thereby enables me to trim the heel of the boot or shoe completely at the single operation of a half-rotation of the heel, and at the same time trim it with a concave slant or other form, if desired. Letter K is a circular plate secured to the face of the sliding frame, whose face corresponds with that of the heel-plate, and against which the sole of the shoe is pressed as it rotates to keep the heel steady under the action of the cutters. Letter J is a frame attached to the pattern or heel plate having a toe-piece and spring at its lower end to accommodate varying sizes of shoes. Letter $m$ is a set-screw for holding the bolt or center-pin $b'$ in its place.

Operation: Attach the pattern or heel plate to the heel of the boot or shoe; then with your foot on the treadle bring the sliding frame down far enough to permit the pattern-plate to engage in the center-pins $b$ and $b'$. Now with the right hand keep the shoe steady, with the sole pressed against the face of the plate K, and with the left hand push up the center-pin $b'$ and set it with the screw $m$. Put the machine in motion with the right hand and with the left take hold of the toe of the boot or shoe and turn it on its axis the full circle of the heel, and the work is done.

Having now described my invention and its operations, I will proceed to set forth what I claim and desire to secure by Letters Patent of the United States—

1. The use of the vertical sliding frame having a horizontal axis on which to center the heel of the boot or shoe, in combination with a rotary cutter arranged in a fixed standard with its axis parallel with the axis of the sliding frame on which the shoe is centered for the purpose of trimming the heel from end to end, as hereinbefore set forth.

2. The use of the pattern plate when secured to the heel of a boot or shoe in a vertical position so as to obtain a center round which the heel turns, in combination with a guide-roller on the axis of a horizontal rotary cutter and the rotary cutters, substantially as hereinbefore set forth.

3. The use of a shoulder or loose roller on the end of the cutter-stock as a counter-protector, in combination with a rotary cutter and a boot or shoe when suspended vertically so as to turn on an axis parallel with the axis of the rotary cutter, substantially as hereinbefore set forth.

4. The use of the spring for supporting the sliding frame in a vertical position in the guideways of the standard with an elastic pressure under the action of the rotary cutter, in combination with the sliding frame of a boot or shoe heel trimming machine and the treadle for operating the same, substantially as set forth.

C. H. HELMS.

Witnesses:
CHARLES L. BARRITT,
JAS. HENDERSON.